(12) United States Patent
Kaszynski

(10) Patent No.: US 7,404,023 B1
(45) Date of Patent: Jul. 22, 2008

(54) METHOD AND APPARATUS FOR PROVIDING CHANNEL BONDING AND CLOCK CORRECTION ARBITRATION

(75) Inventor: Robert J. Kaszynski, Mendota Heights, MN (US)

(73) Assignee: Xilinx, Inc., San Jose, CA (US)

( * ) Notice: Subject to any disclaimer, the term of this patent is extended or adjusted under 35 U.S.C. 154(b) by 479 days.

(21) Appl. No.: 11/036,495

(22) Filed: Jan. 14, 2005

(51) Int. Cl.
*G06F 13/14* (2006.01)
(52) U.S. Cl. .................................. 710/240; 709/238
(58) Field of Classification Search ............... 375/219, 375/372; 709/238; 710/240
See application file for complete search history.

(56) References Cited

U.S. PATENT DOCUMENTS 7,099,426 B1 * 8/2006 Cory et al. .................. 375/372

2005/0058186 A1 * 3/2005 Kryzak et al. ............... 375/219
2005/0256969 A1 * 11/2005 Yancey et al. ............... 709/238

OTHER PUBLICATIONS

Xilinx, RocketIO(TM) Transceiver User Guide, UG024 (v2.1) Jun. 12, 2003, 146 pp.*
Xilinx, Inc., "RockelO™ X Transceiver User Guide", ug035, v1.4, Jun. 29, 2004, Ch. 2, pp. 1-10 and 37-66, available from Xilinx, Inc., 2100 Logic Drive, San Jose, CA 95124.

* cited by examiner

*Primary Examiner*—Clifford Knoll
(74) *Attorney, Agent, or Firm*—LeRoy D. Maunu

(57) ABSTRACT

A method and apparatus for providing channel bonding and clock correction arbitration in integrated circuits are disclosed. An arbitration device analyzes indicators to determine when clock correction request or a channel bonding request occur simultaneously. Then, the arbitration device determines whether to service the simultaneously occurring clock correction request first or a channel bonding request first based upon user selected arbitration logic.

25 Claims, 7 Drawing Sheets

METHOD AND APPARATUS FOR PROVIDING CHANNEL BONDING AND CLOCK CORRECTION ARBITRATION

FIELD OF THE INVENTION

This disclosure relates in general to channel bonding and clock correction arbitration.

BACKGROUND

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In some CPLDs, configuration data is stored on-chip in non-volatile memory. In other CPLDs, configuration data is stored on-chip in non-volatile memory, then downloaded to volatile memory as part of an initial configuration sequence.

As data transfer speeds have increased, high-speed differential serial lines have replaced large parallel buses in many designs. A Serializer/Deserializer (SERDES) converts parallel data into differential serial data, and differential serial data into parallel data. The interfacing requirements between a parallel data bus and a chip on a printed circuit board are implemented by a Protocol Controller device. To increase serial transmission speed, these parallel buses must increase either in width or in data speed. In the transmission of data, transceivers send and receive packets of data on serial data lines. The protocol controller creates or "frames" these packets, which are then sent to the SERDES for to the data processing logic or memory.

To provide higher bandwidth channel bonding is often used. Channel bonding is essentially a low-level load balancing technique that is accomplished by tying several serial channels together to create one logical aggregate channel. Several channels may be fed on a transmit side by one parallel bus and reproduced on a receive side as an identical parallel bus. The channel bonding match logic finds channel bond (CB) characters across word boundaries and performs a realignment of the data. A further description of channel bonding is found in Chapter 2 of the RocketIO™ Transceiver User Guide, ugO35, Jun. 29, 2004, from Xilinx Inc. of San Jose, Calif., which is herein incorporated by reference. Moreover, clock correction is needed when the rate that receive data is either slower or faster than the rate of retrieved data from a read side of a receiver.

Channel bonding and clock correction arbitration prevents packet corruption caused by match characters with insufficient spacing and also allows the user to tailor the response to the application. Clock correction and channel bonding circuits require a finite amount of time to execute their tasks and therefore require that the match characters in the packet be placed at specific intervals. If the characters are too closely spaced the circuits either ignore the character or corrupt the packet.

When correcting for misalignment, match characters cause the issuing of channel bonding (CB) requests. Packet buffer threshold indications can cause clock correction (CC) requests. If channel bonding (CB) requests and clock correction (CC) requests occur simultaneously, current implementations of channel bonding and clock correction do not allow for any adjustment and therefore force the user to adapt the packet to the circuit implementation.

It can be seen then that there is a need for a method and apparatus for providing channel bonding and clock correction arbitration in.

SUMMARY

To overcome the limitations described above, and to overcome other limitations that will become apparent upon reading and understanding the present specification, the present invention discloses a method, and apparatus for providing channel bonding and clock correction arbitration in an integrated circuit.

Embodiments of the present invention solves the above-described problems by providing an arbitrator with flexible control to allow users to adjust the behavior of the arbitration logic.

An embodiment according to the present invention analyzes indicators to determine when clock correction request or a channel bonding request occur simultaneously. Then, a determination is made whether to service the simultaneously occurring clock correction request first or a channel bonding request first based upon user selected arbitration logic.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

Embodiments of the present invention include a method, and apparatus for providing channel bonding and clock correction arbitration in a transceiver, for example a multi-gigabit transceiver, located in an integrated circuit(IC). In one embodiment the IC in a programmable logic device (PLD) which may include a FPGA. An arbitrator is provided with flexible control to allow users to adjust the behavior of the arbitration logic.

Figure 1:
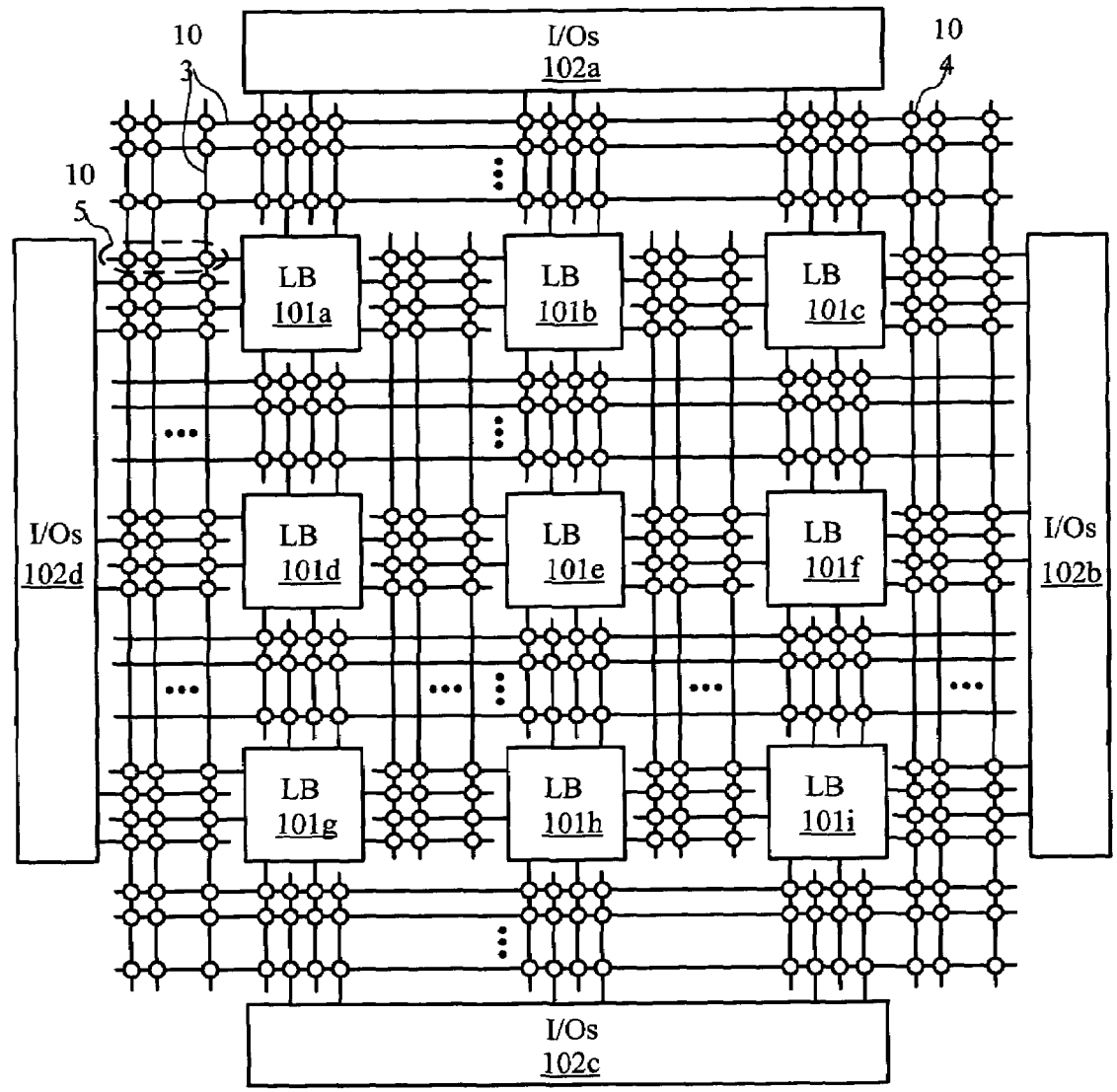
FIG. 1 is a simplified illustration of an exemplary FPGA.

FIG. 1 is a simplified illustration of an exemplary FPGA. The FPGA of FIG. 1 includes an array of configurable logic blocks (LBs 101a-101i) and programmable input/output blocks (I/Os 102a-102d). The LBs and I/O blocks are interconnected by a programmable interconnect structure that includes a large number of interconnect lines 103 interconnected by programmable interconnect points (PIPs 104, shown as small circles in FIG. 1). PIPs are often coupled into groups (e.g., group 105) that implement multiplexer circuits selecting one of several interconnect lines to provide a signal to a destination interconnect line or logic block. Some FPGAs also include additional logic blocks with special purposes (not shown), e.g., DLLs, RAM, and so forth.

Figure 2:
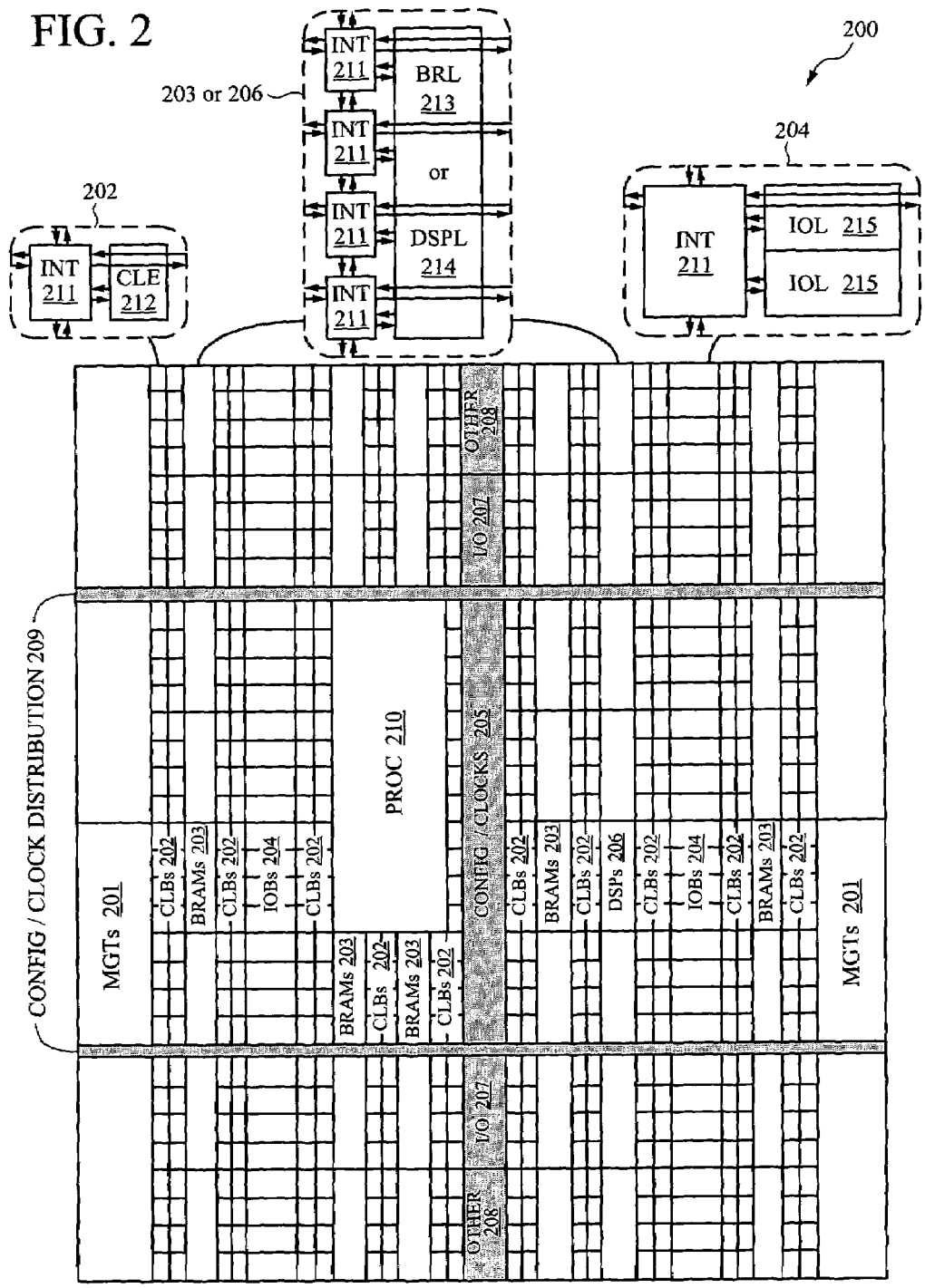
FIG. 2 illustrates an FPGA architecture according to an embodiment of the present invention.

FIG. 2 illustrates an FPGA architecture 200 according to an embodiment of the present invention. As noted above, advanced FPGAs can include several different types of programmable logic blocks in the array. For example, in FIG. 2, the FPGA architecture 200 includes a large number of different programmable tiles including multi-gigabit transceivers (MGTs 201), configurable logic blocks (CLBs 202), random access memory blocks (BRAMs 203), input/output blocks (IOBs 204), configuration and clocking logic (CONFIG/CLOCKS 205), digital signal processing blocks (DSPs 206), specialized input/output blocks (I/O 207) (e.g., configuration ports and clock ports), and other programmable logic 208 such as digital clock managers, analog-to-digital converters, system monitoring logic, and so forth. Some FPGAs also include dedicated processor blocks (PROC 210).

In some FPGAs, each programmable tile includes a programmable interconnect element (INT 211) having standardized connections to and from a corresponding interconnect element in each adjacent tile. Therefore, the programmable interconnect elements taken together implement the programmable interconnect structure for the illustrated FPGA. The programmable interconnect element (INT 211) also includes the connections to and from the programmable logic element within the same tile, as shown by the examples included at the top of FIG. 2.

For example, a CLB 202 can include a configurable logic element (CLE 212) that can be programmed to implement user logic plus a single programmable interconnect element (INT 211). A BRAM 203 can include a BRAM logic element (BRL 213) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 206 can include a DSP logic element (DSPL 214) in addition to an appropriate number of programmable interconnect elements. An IOB 204 can include, for example, two instances of an input/output logic element (IOL 215) in addition to one instance of the programmable interconnect element (INT 211). As will be clear to those of skill in the art, the actual I/O pads connected, for example, to the I/O logic element 215 are manufactured using metal layered above the various illustrated logic blocks, and typically are not confined to the area of the input/output logic element 215.

In the pictured embodiment, a columnar area near the center of the die (shown shaded in FIG. 2) is used for configuration, clock, and other control logic. Horizontal areas 209 extending from this column are used to distribute the clocks and configuration signals across the breadth of the FPGA.

Some FPGAs utilizing the architecture illustrated in FIG. 2 include additional logic blocks that disrupt the regular columnar structure making up a large part of the FPGA. The additional logic blocks can be programmable blocks and/or dedicated logic. For example, the processor block PROC 210 shown in FIG. 2 spans several columns of CLBs and BRAMs. Configuration logic 205 allows configuration data values to be loaded into the FPGA architecture 200.

Note that FIG. 2 is intended to illustrate only one example of an FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 2 are purely exemplary. For example, in an actual FPGA more than one adjacent column of CLBs is typically included wherever the CLBs appear, to facilitate the efficient implementation of user logic.

Figure 3:
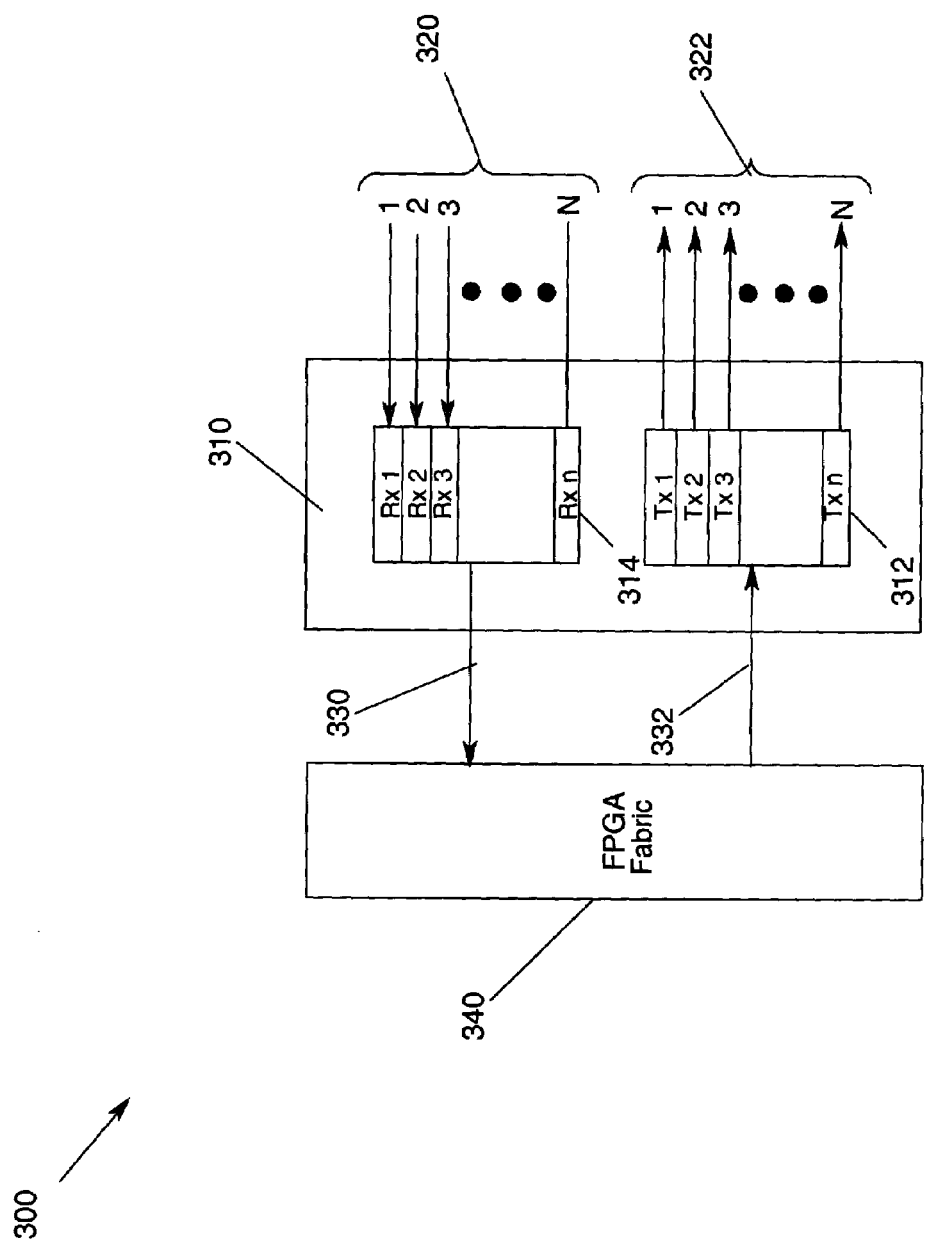
FIG. 3 is a block diagram illustrating channel bonding according to an embodiment of the present invention.

FIG. 3 is a block diagram 300 illustrating channel bonding according to an embodiment of the present invention. In FIG. 3, multiple transceivers represented by block 310 are provided in parallel to provide higher data rates. Words of data are split into bytes, with each byte sent over a separate channel (transceiver). Tying several serial channels together creates one aggregate channel. Several channels may be fed on the transmit side by one parallel bus and reproduced on the receive side as the identical parallel bus using multiple transceiver. For example, a plurality of transmitters 312 may be fed on the transmit side by one parallel bus 332 from a fabric 340. Several serial transmit channels are tied together to create one aggregate transmit channel 332. On the receive side, several serial receive channels 420 may be used by a plurality of receivers 414 to produce a similar parallel data stream 330. Bonding multiple parallel channels together allows the transfer of wider databuses from one point to another point. Accordingly, a very high point-to-point bandwidth may be achieved.

Figure 4:
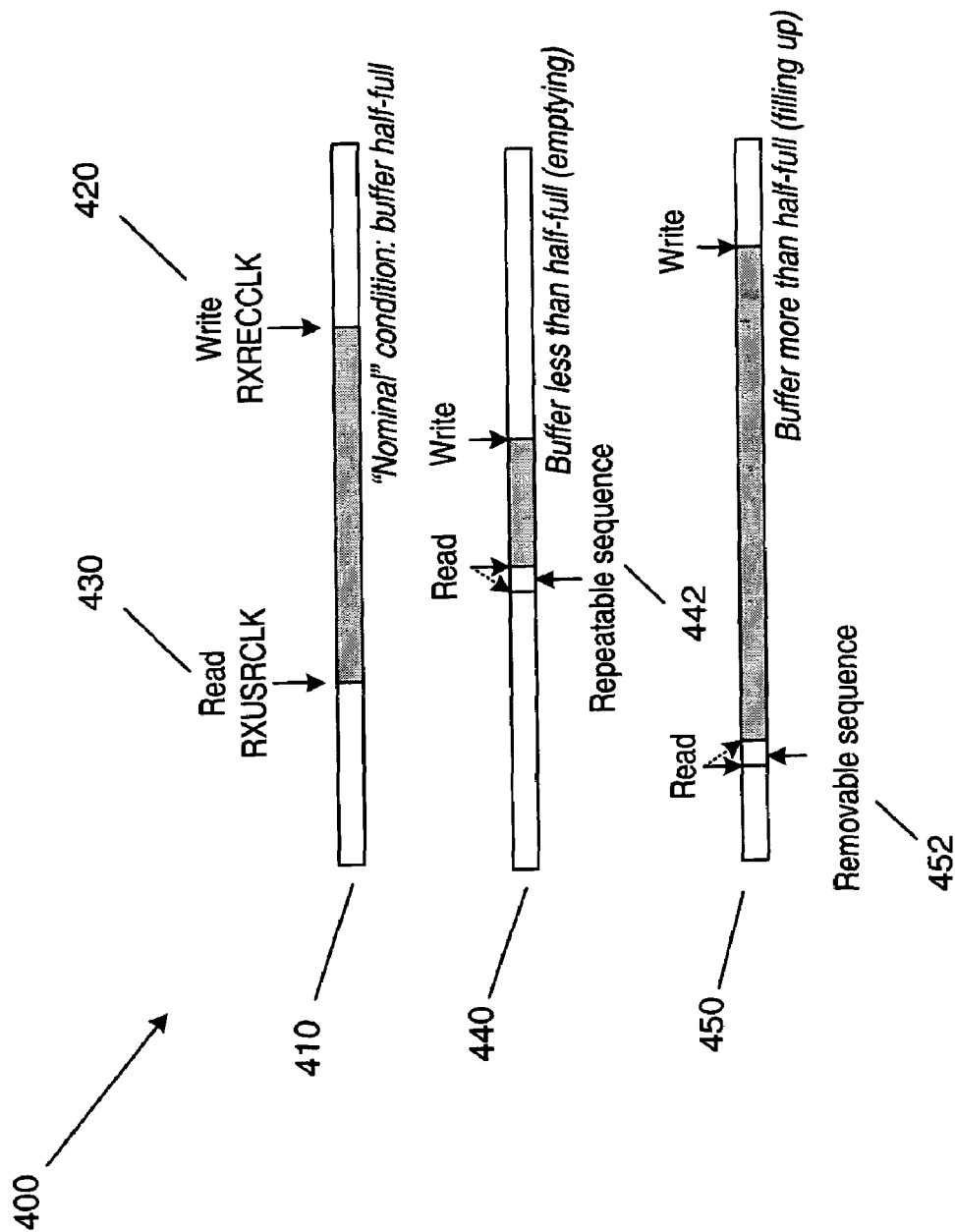
FIG. 4 is a diagram illustrating clock correction according to an embodiment of the present invention.

FIG. 4 is a diagram 400 illustrating clock correction according to an embodiment of the present invention. Ideally, the data rate of the incoming data and the rate at which the FPGA fabric consumes the data are identical. However, since the recovered clock and the internal FPGA user clock typically have different sources, one of the clocks will be faster than the other. The receiver buffer accommodates this difference between the clock rates. The receiver uses an elastic buffer, where "elastic" refers to the ability to modify the read pointer for clock correction and channel bonding.

Nominally, the buffer is always half full 410. Received data is inserted via a write pointer under control of recovered clock 420. The FPGA fabric reads data via the read pointer under control of internal FPGA user clock 430. The half full/half empty condition of the buffer gives a cushion for the differing clock rates. This operation continues indefinitely, regardless of whether or not "meaningful" data is being received. When there is no meaningful data to be received, the incoming data will consist of IDLE characters or other padding.

For example, if the recovered clock is slower, the buffer becomes more empty over time 440. The clock correction logic corrects for this by decrementing the read pointer to reread a repeatable byte sequence 442. A read pointer may be decremented instead of incrementing it in the usual fashion so that the buffer is partially refilled. The transceiver design will repeat a single repeatable byte sequence 442 when necessary to refill a buffer. Similarly, if recovered clock is faster than the receiver clock, the buffer will fill up over time 450. The clock correction logic may correct for this by incrementing a read pointer to skip over a removable byte sequence 452 that need not appear in the final FPGA fabric byte stream. This accelerates the emptying of the buffer, preventing its overflow. The transceiver design will skip a single byte sequence when necessary to partially empty a buffer. These operations require the clock correction logic to recognize a byte sequence that can be freely repeated or omitted in the incoming data stream. This sequence may generally include special values that occur in the gaps separating packets of meaningful data. These gaps facilitate the timely execution of clock correction.

Figure 5:
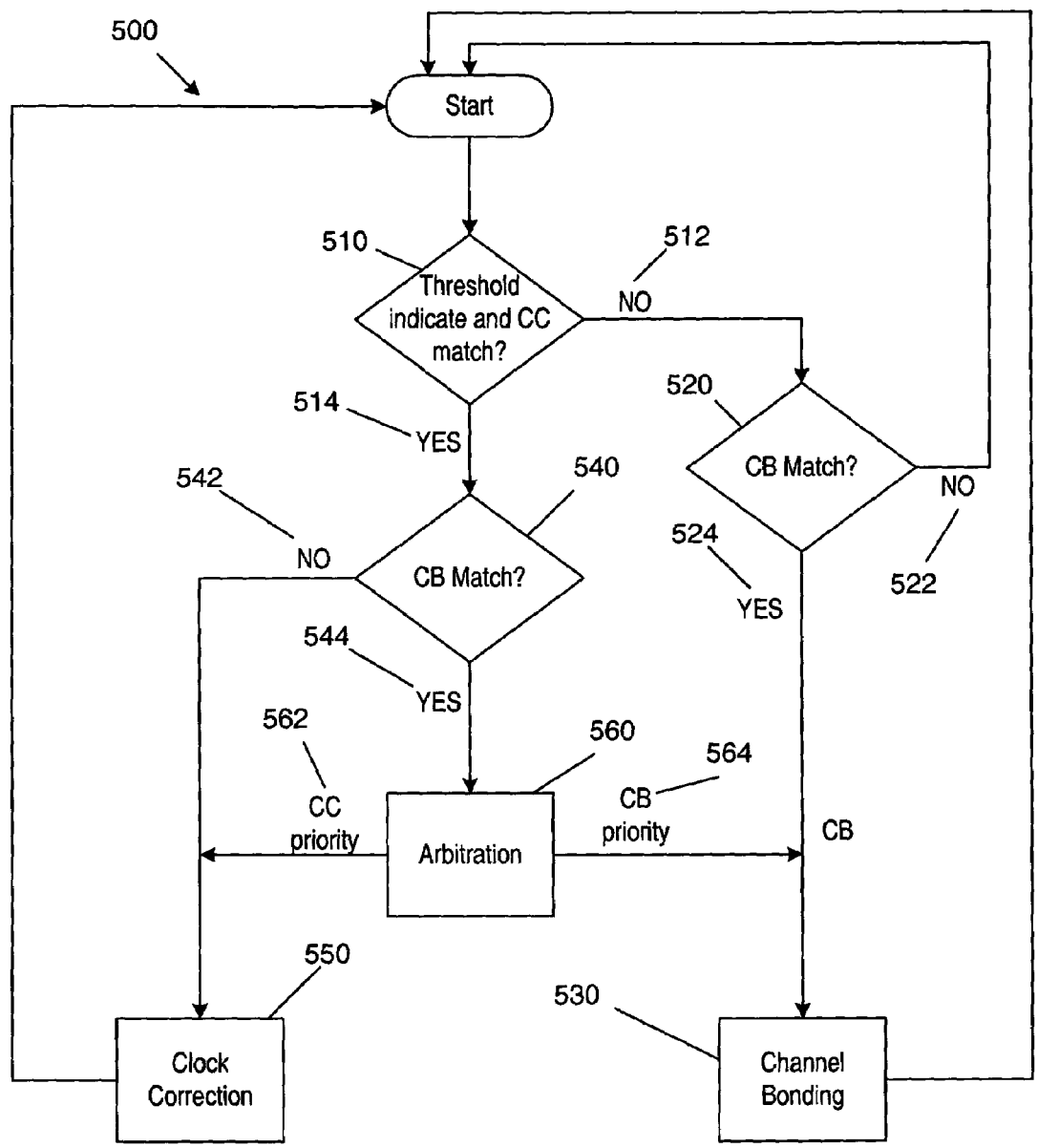
FIG. 5 is a flow chart for a method of providing channel bonding and clock correction in field programmable gate arrays according to an embodiment of the present invention.

FIG. 5 is a flow chart for a method of providing channel bonding and clock correction arbitration in a MGT according to an embodiment of the present invention. In FIG. 5, a determination is made whether a clock correction (CC) match occurs and a threshold indication is received 510. If not 512, a determination is made whether a channel bonding (CB) match occurs 520. If not 522, the system continues to monitor for a character matches and threshold indications. If yes 524, channel bonding is performed 530. If a clock correction match and threshold indication occurs 514, a determination is made whether a channel bonding (CB) match occurs 540. If not 542, clock correction is performed 550. If both channel bonding and clock correction requests are determined to occur simultaneously 544, user adjustable arbitration logic determines the order to process requests 560. The user may require that channel bonding requests are serviced first, clock correction requests are serviced first or requests are serviced based upon type rotation. If clock correction is given priority 562, clock correction is performed 550. If channel bonding is given priority 562, channel bonding is performed 530. One embodiment of the arbitration finite state machine performing arbitration 560 of the present invention is given in the Appendix which is herein incorporated by reference. The Verilog code in the Appendix represents an arbitration circuit of one embodiment of the present invention.

Figure 6:
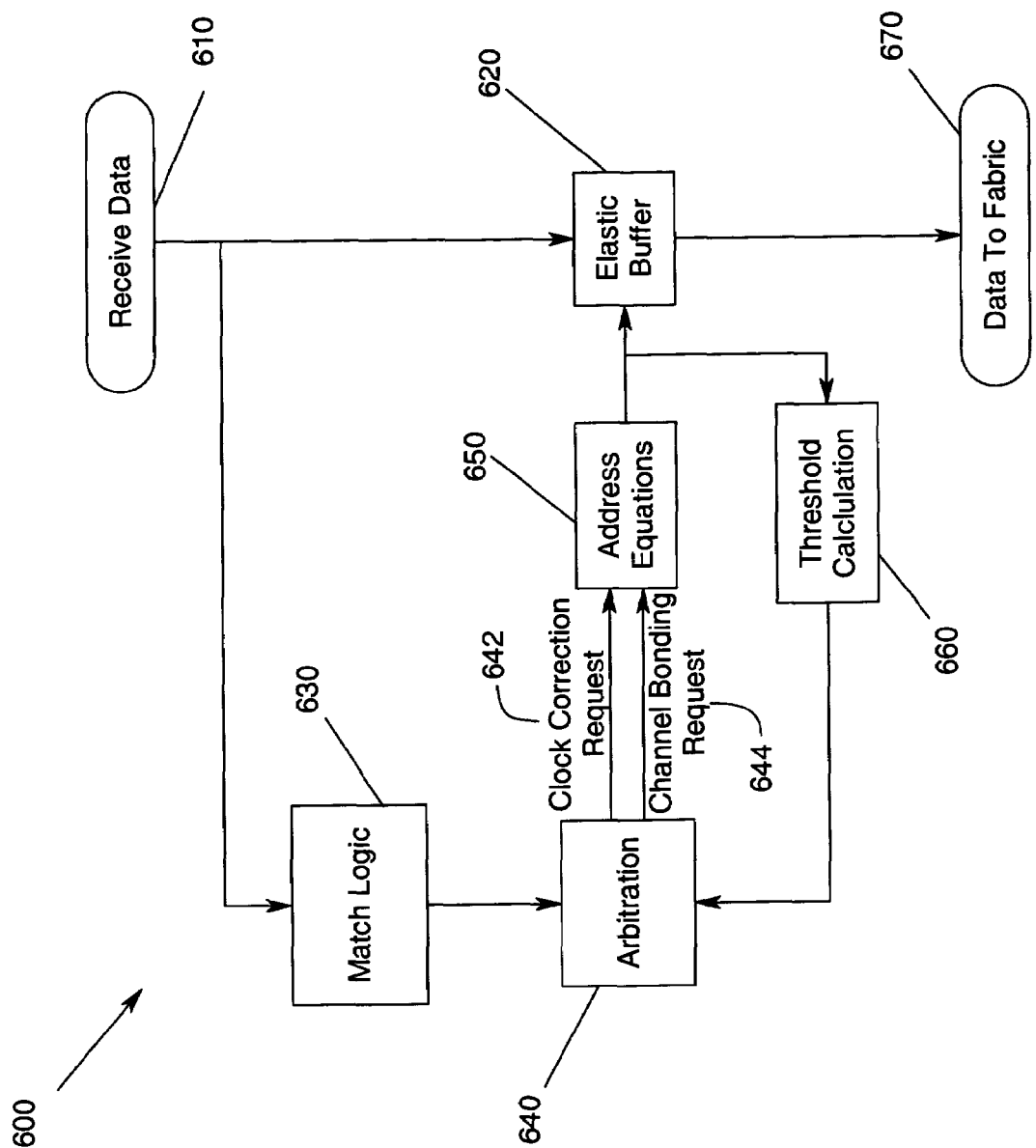
FIG. 6 illustrates a block diagram of a receive system with user defined arbitration according to an embodiment of the present invention.

FIG. 6 illustrates a block diagram 600 of a receive system with user defined arbitration according to an embodiment of the present invention. Block diagram 600 can be implemented in one embodiment as circuitry in a standalone transceiver or in another embodiment as part of a MGT in a PLD such as an FPGA or in yet another embodiment in some combination thereof or in other embodiments as a circuit as part of an application specific integrated circuit (ASIC). In FIG. 6, data is received 610. The received data 610 is provided to an elastic buffer 620. Match logic 630 analyzes the received data 610 to determine whether match characters exist. Arbitration 640 is provided for determining whether to service a clock correction request 642 or a channel bonding request 644. The arbitrator 640 prevents packet corruption caused by match characters with insufficient spacing and also allows the user to tailor the response to the application. Clock correction and channel bonding require a finite amount of time for execution and therefore require that the match characters in the packet be placed at specific intervals. If the characters are too closely spaced either the character is ignored or the packet is corrupted. The addition of a programmable arbitrator circuit 640 allows the user to adjust the behavior of the circuits based on the transmission protocol.

Channel bonding match characters cause the issuing of channel bonding (CB) requests 644. Clock correction match characters with packet buffer threshold indications from the threshold calculation device cause clock correction (CC) requests 642. If the clock correction (CC) request 642 and the channel bonding (CB) request 644 occur simultaneously, the arbitration logic 640 will determine the order in which the requests are serviced based on user requirements. The user may require that CB requests are serviced first, CC requests first, or priority may be determined on a rotating basis.

Based upon the arbitrator 640, either CC requests 642 or CB requests 644 are provided to address equations 650. The address equations 650 control the elastic buffer 620. The outputs of the address equations 650 are also provided to a threshold calculation device 660 for generating threshold indications. The elastic buffer 620 then provides data to the fabric 670.

Figure 7:
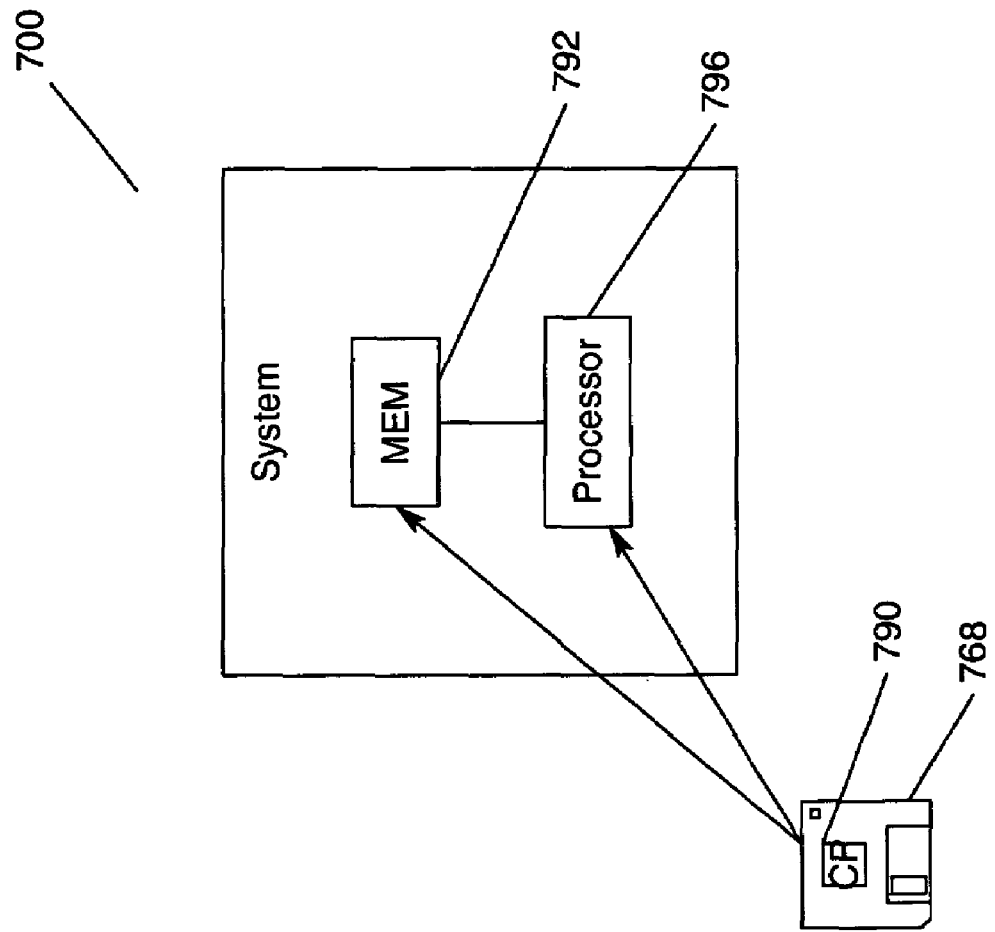
FIG. 7 illustrates a system and computer-readable medium or carrier for providing channel bonding and clock correction in field programmable gate arrays according to an embodiment of the present invention.

FIG. 7 illustrates a system 700 according to an embodiment of the present invention, wherein the process illustrated with reference to FIGS. 2-6 may be tangibly embodied in a computer-readable medium or carrier, e.g. one or more of the fixed and/or removable data storage devices 768 illustrated in FIG. 7, or other data storage or data communications devices. A computer program 790 expressing the processes embodied on the removable data storage devices 768 may be loaded into the memory 792 or processor 796, e.g., in a processor (not shown), to configure the system 700 of FIG. 7, for execution. The computer program 790 comprise instructions which, when read and executed by the system 700 of FIG. 7, causes the system 700 to perform the steps necessary to execute the steps or elements of embodiments of the present invention.

Thus, an arbitrator may be provided with flexible control to allow users to adjust the behavior of the arbitration logic. The user adjustable arbitrator determines the order to process requests. The user may require that channel bonding requests are serviced first, clock correction requests are serviced request or requests are serviced based upon type rotation.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

APPENDIX

```
/*
Description:
State machine for the CB master to arbitrate for the slaves between
thresholds and CB matches.
    1. CB master     controls match generation
    2. CB slave      passes matches asynchronously
    3. CC master     controls above/belowThreshold to CC module
                     that generates common_arm to slaves
    4. CC slave      controls above/belowThreshold to CC module
                     that has no effect because the arm comes from the
                     master
    5. CC only       controls above/belowThreshold to CC module
                     that generates a local arm signal
    6. reset conditons will be filtered so the pointer difference will not
       be used until 4 clocks after the reset to allow time for diff to
       settle
*/
'timescale 1 ns / 1 ps
module arbitrator(
//inputs
    rd_clk,
    rstn_rd_clk,
    align_reset,
    enchansync_rdclk,
    cb_master,
    mc_chan_bond_limit,
    mc_cccb_arbitrator_disable,
    common_arm,
    statWrPtrMinusRd0_async,
    cb_scrbrd_match,
    mc_clk_correct_use,
    mc_clk_cor_max_lat,
    mc_clk_cor_min_lat,
//outputs
    cb_scrbrd_match_arb,
    channel_bond_active,
    clock_correct_active,
    aboveThreshold,
    belowThreshold
    );
    input     rd_clk;
    input     rstn_rd_clk;
    input     align_reset;   //Initialize the arb on first CB event
                             after enchansync
low to high transition
    input     enchansync_rdclk;
    input     cb_master;
    input [5:0] mc_chan_bond_limit;
    input     mc_cccb_arbitrator_disable;
    input     common_arm;
    input     cb_scrbrd_match;
    input     mc_clk_correct_use;
    input [5:0] mc_clk_cor_max_lat;
    input [5:0] mc_clk_cor_min_lat;
    input [5:0] statWrPtrMinusRd0_async; //pointer difference
    output    cb_scrbrd_match_arb;
    output    channel_bond_active;
    output    clock_correct_active;
    output    aboveThreshold;
    output    belowThreshold;
    reg       cb_scrbrd_match_arb;
    reg       channel_bond_active;
    reg       clock_correct_active;
    reg       aboveThreshold;
    reg       belowThreshold;
// State defn's
    parameter [3:0]   idle         = 4'b0000,
                      cc_above_init = 4'b0001,
                      cc_above_wait = 4'b0010,
                      cc_below_init = 4'b0011,
                      cc_below_wait = 4'b0100,
                      cb_init      = 4'b0101,
                      cb_wait      = 4'b0110,
                      reset_init0  = 4'b1100,   // Wait 4 clocks to ensure
                                                read and write
                      pointer diff has settled
                      reset_init1  = 4'b1101,
                      reset_init2  = 4'b1110,
                      reset_init3  = 4'b1111;
    parameter cb_delay = 6'h0f;
    reg [5:0] wait_counter, wait_counter_d;
    reg [3:0] current_state;
    reg [3:0] next_state;
    reg [3:0] aboveThreshold_filter;
    reg [3:0] belowThreshold_filter;
    reg       aboveThreshold_arb;
    reg       belowThreshold_arb;
    wire belowThreshold_in = & belowThreshold_filter; //pointers
        do not reset in an
orderly
    wire aboveThreshold_in = & aboveThreshold_filter; //manner
        so a filter is needed
    always @ (aboveThreshold_in or belowThreshold_in or
cb_scrbrd_match or
        wait_counter or common_arm or mc_cccb_arbitrator_disable
        or enchansync_rdclk or cb_master or
        current_state or mc_clk_correct_use or
mc_chan_bond_limit)
        case(current_state)
        reset_init0:
            begin
                clock_correct_active = 1'b0;
                channel_bond_active = 1'b0;
                aboveThreshold_arb = 1'b0;
                belowThreshold_arb = 1'b0;
                wait_counter_d = 6'h00;
                next_state = reset_init1;
            end
        reset_init1:
            begin
                clock_correct_active = 1'b0;
                channel_bond_active = 1'b0;
                aboveThreshold_arb = 1'b0;
                belowThreshold_arb = 1'b0;
                wait_counter_d = 6'h00;
                next_state = reset_init2;
            end
        reset_init2:
            begin
                clock_correct_active = 1'b0;
                channel_bond_active = 1'b0;
                aboveThreshold_arb = 1'b0;
                belowThreshold_arb = 1'b0;
                wait_counter_d = 6'h00;
                next_state = reset_init3;
            end
        reset_init3:
            begin
                clock_correct_active = 1'b0;
                channel_bond_active = 1'b0;
                aboveThreshold_arb = 1'b0;
                belowThreshold_arb = 1'b0;
                wait_counter_d = 6'h00;
                next_state = idle;
            end
        idle:
            begin
                clock_correct_active = 1'b0;
                channel_bond_active = 1'b0;
                aboveThreshold_arb = 1'b0;
                belowThreshold_arb = 1'b0;
                wait_counter_d = 6'h00;
//              CC has priority
                //CC master or slave
                if (mc_cccb_arbitrator_disable)
                    next_state = idle;
                else if
                    (aboveThreshold_in &&         //above threshold
                mc_clk_correct_use)
                    next_state =                  //cc request
                    cc_above_init;
                else if
```

APPENDIX (continued)

```
                (belowThreshold_in &&              //below threshold
            mc_clk_correct_use)
                next_state =                       //cc request
                  cc_below_init;
            //CB master only
            else if (enchansync_rdclk           //enable and master
                  && cb_master &&
                  cb_scrbrd_match)              //and match
                next_state = cb_init;           //cb request
            else next_state = idle;
    end //idle
    cc_above_init:
        begin
            clock_correct_active = 1'b1;        //wait for common_arm
                                                  to set
            channel_bond_active = 1'b0;
            wait_counter_d = 6'h00;
            aboveThreshold_arb = 1'b1;
            belowThreshold_arb = 1'b0;
            if (!common_arm)    next_state = cc_above_init;
            else                next_state = cc_above_wait;
        end //cc_init
    cc_above_wait:
        begin
            clock_correct_active = 1'b1;
            channel_bond_active = 1'b0;
            wait_counter_d = 6'h00;
                aboveThreshold_arb = 1'b1;
                belowThreshold_arb = 1'b0;
            if (!common_arm) next_state = idle;
            else             next_state = cc_above_wait;
        end //cc_wait
    cc_below_init:
        begin
            clock_correct_active = 1'b1;        //wait for common_arm
                                                  to set
            channel_bond_active = 1'b0;
            wait_counter_d = 6'h00;
                aboveThreshold_arb = 1'b0;
                belowThreshold_arb = 1'b1;
            if (!common_arm)    next_state = cc_below_init;
            else                next_state = cc_below_wait;
        end //cc_init
    cc_below_wait:
        begin
            clock_correct_active = 1'b1;
            channel_bond_active = 1'b0;
            wait_counter_d = 6'h00;
                aboveThreshold_arb = 1'b0;
                belowThreshold_arb = 1'b1;
            if (!common_arm) next_state = idle;
            else             next_state = cc_below_wait;
        end //cc_wait
    cb_init:
        begin
            clock_correct_active = 1'b0;
            channel_bond_active = 1'b1;
                aboveThreshold_arb = 1'b0;
                belowThreshold_arb = 1'b0;
            wait_counter_d = cb_delay +
              ({2'b00, mc_chan_bond_limit[5:2]});
            next_state = cb_wait;
        end //cb_init
    cb_wait:
        begin
            clock_correct_active = 1'b0;
            channel_bond_active = 1'b1;
                aboveThreshold_arb = 1'b0;
                belowThreshold_arb = 1'b0;
            wait_counter_d = wait_counter - 1'b1;
            if (wait_counter == 6'h00) next_state = idle;
            else              next_state = cb_wait;
        end //cb_wait
    default:
        begin
            clock_correct_active = 1'b0;
            channel_bond_active = 1'b0;
                aboveThreshold_arb = 1'b0;
                belowThreshold_arb = 1'b0;
            wait_counter_d = 6'h00;
            next_state = idle;
        end //default
    endcase
//outputs
always @ (cb_master or next_state or cb_scrbrd_match or
  mc_cccb_arbitrator_disable)
            if (((mc_cccb_arbitrator_disable || !cb_master) &&
              cb_scrbrd_match) ||
                                            //cb slave or disabled and match
                (next_state ==              //cb master and entering cb cycle
                  cb_init))
            cb_scrbrd_match_arb = 1;
        else    cb_scrbrd_match_arb = 0;
always @ (belowThreshold_in or aboveThreshold_in or
  mc_cccb_arbitrator_disable or aboveThreshold_arb or
  belowThreshold_arb)
        if (mc_cccb_arbitrator_disable)
            begin
                aboveThreshold = aboveThreshold_in;   //disabled
                belowThreshold = belowThreshold_in;   //use filter
                                                        output
            end
        else
            begin
                aboveThreshold = aboveThreshold_arb;  //enabled
                belowThreshold = belowThreshold_arb;  //use
                                                        arbitrator
                                                        output
            end
always @ (posedge rd_clk or negedge rstn_rd_clk)
        if (!rstn_rd_clk)
            begin
                current_state <= reset_init0;
                wait_counter <= 6'h00;
                aboveThreshold_filter <= 4'h0;
                belowThreshold_filter <= 4'h0;
            end //reset
        else if (align_reset)
            begin
                current_state <= reset_init0;
                wait_counter <= 6'h00;
                aboveThreshold_filter <= 4'h0;
                belowThreshol_filter <= 4'h0;
            end //align_reset
        else
            begin
                current_state <= next_state;
                wait_counter <= wait_counter_d;
// Calculate the adjustment needed when the difference between the
pointers is too great and idles must be eliminated.
                aboveThreshold_filter[3:1] <=
                  aboveThreshold_filter[2:0];
                if (statWrPtrMinusRd0_async >
                  mc_clk_cor_max_lat)
                        aboveThreshold_filter[0] <= 1'b1;
                    else    aboveThreshold_filter[0] <= 1'b0;
// Calculate the adjustment needed when the difference between the
pointers is too small and idles must be repeated.
                belowThreshold_filter[3:1] <=
                  belowThreshold_filter[2:0];
                if (statWrPtrMinusRd0_async <
                  mc_clk_cor_min_lat)
                        belowThreshold_filter[0] <= 1'b1;
                    else    belowThreshold_filter[0] <= 1'b0;
            end //clock
endmodule //_arbitrator
```

What is claimed is:

1. A method for providing channel bonding and clock correction arbitration in a programmable logic device, comprising:

analyzing indicators to determine when clock correction request or a channel bonding request occur simultaneously; and determining whether to service the simultaneously occurring clock correction request first or a channel bonding request first based upon user selected arbitration logic.

2. The method of claim 1 further comprising modifying by a user the arbitration logic for controlling whether to service a clock correction request first or a channel bonding request first.

3. The method of claim 1 further comprising providing received data to an elastic buffer and controlling the buffer according to the determining whether to service the simultaneously occurring clock correction request first or a channel bonding request first.

4. The method of claim 1, wherein the determining whether to service a clock correction request first or a channel bonding request first comprises preventing packet corruption caused by match characters with insufficient spacing by causing a channel bonding request to be serviced first.

5. The method of claim 1, wherein the determining whether to service a clock correction request first or a channel bonding request first comprises generating packet buffer threshold indications for controlling received data in an elastic buffer.

6. The method of claim 1, wherein the determining whether to service the simultaneously occurring clock correction request first or a channel bonding request first based upon user selected arbitration logic further comprises selecting to process channel bonding requests first when the user configures the arbitration logic to service channel bonding requests first.

7. The method of claim 1, wherein the determining whether to service the simultaneously occurring clock correction request first or a channel bonding request first based upon user selected arbitration logic further comprises selecting to process clock correction requests first when the user configures the arbitration logic to service clock correction requests first.

8. The method of claim 1, wherein the determining whether to service the simultaneously occurring clock correction request first or a channel bonding request first based upon user selected arbitration logic further comprises rotating the selection of clock correction requests and channel bonding requests when the user configures the arbitration logic to service clock correction requests and channel bonding requests on a rotating basis.

9. A transceiver for receiving and transmitting data, the transceiver comprising:

an elastic buffer for receiving and buffering data therein; and an arbitration device, operatively coupled to the elastic buffer, the arbitration device controlling overflow and underflow of the buffer, the arbitration device configured to analyze indicators to determine when a clock correction request and a channel bonding request occur simultaneously and to determine whether to service the clock correction request first or the channel bonding request first based upon user selected arbitration logic.

10. The transceiver of claim 9, wherein the arbitration device is configurable by a user to control whether to service a clock correction request first or a channel bonding request first.

11. The transceiver of claim 9 further comprises match logic device for detecting match characters.

12. The transceiver of claim 11, wherein the arbitration device determines whether to service a clock correction request first or a channel bonding request first to prevent packet corruption caused by match characters detected by the match logic device to have insufficient spacing by causing a channel bonding request to be serviced first.

13. The transceiver of claim 9 further comprises a threshold calculation device for generating packet buffer threshold indications for controlling received data in an elastic buffer.

14. The transceiver of claim 9, wherein the arbitration device is configurable to process channel bonding requests first.

15. The transceiver of claim 9, wherein the arbitration device is configurable to process clock correction requests first.

16. The transceiver of claim 9, wherein the arbitration device is configurable to rotate selection of clock correction requests and channel bonding requests.

17. A programmable logic device, comprising:

input/output blocks (IOBs) for providing interconnections between elements;

configurable logic blocks (CLBs) for implementing logical functions of the programmable logic device; and a transceiver for receiving and transmitting data, the transceiver comprising:

an elastic buffer for receiving and buffering data therein; and an arbitration device, operatively coupled to the elastic buffer, the arbitration device controlling overflow and underflow of the buffer, the arbitration device configured to analyze indicators to determine when a clock correction request and a channel bonding request occur simultaneously and to determine whether to service the clock correction request first or the channel bonding request first based upon user selected arbitration logic.

18. The programmable logic device of claim 17, wherein the arbitration device is configurable by a user to control whether to service a clock correction request first or a channel bonding request first.

19. The programmable logic device of claim 17 further comprises a match logic device for detecting match characters.

20. The programmable logic device of claim 19, wherein the arbitration device determines whether to service a clock correction request first or a channel bonding request first to prevent packet corruption caused by match characters detected by the match logic device to have insufficient spacing by causing a channel bonding request to be serviced first.

21. The programmable logic device of claim 17 further comprises a threshold calculation device for generating packet buffer threshold indications for controlling received data in an elastic buffer.

22. The programmable logic device of claim 17, wherein the arbitration device is configurable to process channel bonding requests first.

23. The programmable logic device of claim 17, wherein the arbitration device is configurable to process clock correction requests first.

24. The programmable logic device of claim 17, wherein the arbitration device is configurable to rotate selection of clock correction requests and channel bonding requests.

25. An article of manufacture, comprising:

a program storage medium readable by a computer, the medium tangibly embodying one or more programs of instructions executable by the computer to perform operations for providing channel bonding and clock correction arbitration in field programmable gate arrays, comprising:

analyzing indicators to determine when clock correction request or a channel bonding request occur simultaneously; and determining whether to service the simultaneously occurring clock correction request first or a channel bonding request first based upon user selected arbitration logic.

* * * * *